US008915478B2

(12) United States Patent
Perez

(10) Patent No.: US 8,915,478 B2
(45) Date of Patent: Dec. 23, 2014

(54) APPARATUS FOR CARRYING CRITICAL CARE EQUIPMENT

(76) Inventor: Adolfo Perez, Alta Loma, CA (US)

( * ) Notice: Subject to any disclaimer, the term of this patent is extended or adjusted under 35 U.S.C. 154(b) by 148 days.

(21) Appl. No.: 13/586,680

(22) Filed: Aug. 15, 2012

(65) Prior Publication Data

US 2012/0304390 A1  Dec. 6, 2012

Related U.S. Application Data

(63) Continuation-in-part of application No. 12/316,286, filed on Dec. 10, 2008, now abandoned.

(51) Int. Cl.
| | | |
|---|---|---|
| A61G 1/04 | (2006.01) | |
| F16M 11/42 | (2006.01) | |
| F16M 11/38 | (2006.01) | |
| F16M 11/32 | (2006.01) | |
| F16M 11/08 | (2006.01) | |
| F16M 13/02 | (2006.01) | |

(52) U.S. Cl.
CPC .............. F16M 11/08 (2013.01); F16M 11/42 (2013.01); F16M 11/38 (2013.01); A61G 1/04 (2013.01); F16M 2200/024 (2013.01); F16M 11/32 (2013.01); F16M 13/02 (2013.01); F16M 2200/044 (2013.01); A61G 2210/30 (2013.01)
USPC .............. 248/439; 248/178.1; 5/505.1; 5/658

(58) Field of Classification Search
CPC .......... A61G 1/04; A61G 1/044; F16M 11/28
USPC ............ 5/503.1, 505.1, 507.1, 626, 629, 658; 108/49; 211/119.006; 296/20; 248/125.8, 168, 170, 177.1, 178.1, 248/188.5, 188.6, 229.16, 230.7, 231.81, 248/346.06, 439, 440, 460
See application file for complete search history.

(56) References Cited

U.S. PATENT DOCUMENTS

| | | | | | |
|---|---|---|---|---|---|
| 2,112,122 | A | * | 3/1938 | Sullivan | ......................... 5/505.1 |
| 3,813,714 | A | * | 6/1974 | Sater | ............................... 108/49 |
| 3,822,049 | A | * | 7/1974 | Saunders | ................. 248/223.41 |
| 4,022,414 | A | * | 5/1977 | Egger | ........................... 248/150 |
| 4,103,982 | A | * | 8/1978 | Rudd | ............................ 439/297 |
| 4,183,110 | A | * | 1/1980 | Kidd et al. | ......................... 5/629 |
| 4,473,912 | A | * | 10/1984 | Scheidel et al. | ................... 5/628 |
| 4,557,453 | A | * | 12/1985 | McCloskey | ................ 248/287.1 |
| 4,783,109 | A | * | 11/1988 | Bucalo | ............................ 296/20 |
| 4,852,830 | A | * | 8/1989 | Howard et al. | ............ 248/183.2 |
| D304,759 | S | * | 11/1989 | McCloskey | .................. D24/184 |
| 4,957,121 | A | * | 9/1990 | Icenogle et al. | .............. 128/897 |
| 5,400,991 | A | * | 3/1995 | Werner | ....................... 248/230.4 |
| 5,497,968 | A | * | 3/1996 | Hewko | ........................... 248/214 |
| 5,707,033 | A | * | 1/1998 | Holt et al. | ................ 248/225.11 |

(Continued)

*Primary Examiner* — Terrell McKinnon
*Assistant Examiner* — Eret McNichols
(74) *Attorney, Agent, or Firm* — James E. Brunton

(57) ABSTRACT

An easily transportable apparatus for carrying critical care equipment, such as an EKG unit, needed by a patient being transported on a conventional gurney, stretcher, or like patient transport device. The apparatus is adjustable so that it can be conveniently attached to gurneys having side rails with different spacing. Additionally, the apparatus includes an equipment support platform to which the critical care equipment can readily be connected. This platform can be connected and disconnected to a tray component that is connected to a turntable. The turntable can be readily rotated 360 degrees so that the equipment can easily be viewed by caregivers located in both the front and rear of the patient transport device.

10 Claims, 17 Drawing Sheets

(56) References Cited

U.S. PATENT DOCUMENTS

| | | | |
|---|---|---|---|
| 5,845,351 A * | 12/1998 | Berta et al. | 5/626 |
| 5,860,176 A * | 1/1999 | Norberg | 5/628 |
| 6,061,853 A * | 5/2000 | Laaksonen et al. | 5/625 |
| 6,065,165 A * | 5/2000 | Delk et al. | 5/628 |
| 6,098,944 A * | 8/2000 | Pangborn et al. | 248/317 |
| 6,175,977 B1 * | 1/2001 | Schumacher et al. | 5/626 |
| 6,435,188 B2 * | 8/2002 | Tyrrell | 128/870 |
| 6,446,285 B1 * | 9/2002 | Chinn | 5/507.1 |
| 6,842,922 B2 * | 1/2005 | Smeed | 5/503.1 |
| 7,458,743 B2 * | 12/2008 | Smeed | 403/92 |
| 8,132,277 B2 * | 3/2012 | Buchanan | 5/627 |
| 2002/0002977 A1 * | 1/2002 | Tyrrell | 128/870 |
| 2003/0046764 A1 * | 3/2003 | Smeed | 5/503.1 |
| 2003/0115671 A1 * | 6/2003 | Smeed | 5/503.1 |
| 2008/0028997 A1 * | 2/2008 | Gramke | 108/49 |
| 2008/0178383 A1 * | 7/2008 | Jordan | 5/89.1 |
| 2010/0139005 A1 * | 6/2010 | Perez | 5/658 |

* cited by examiner

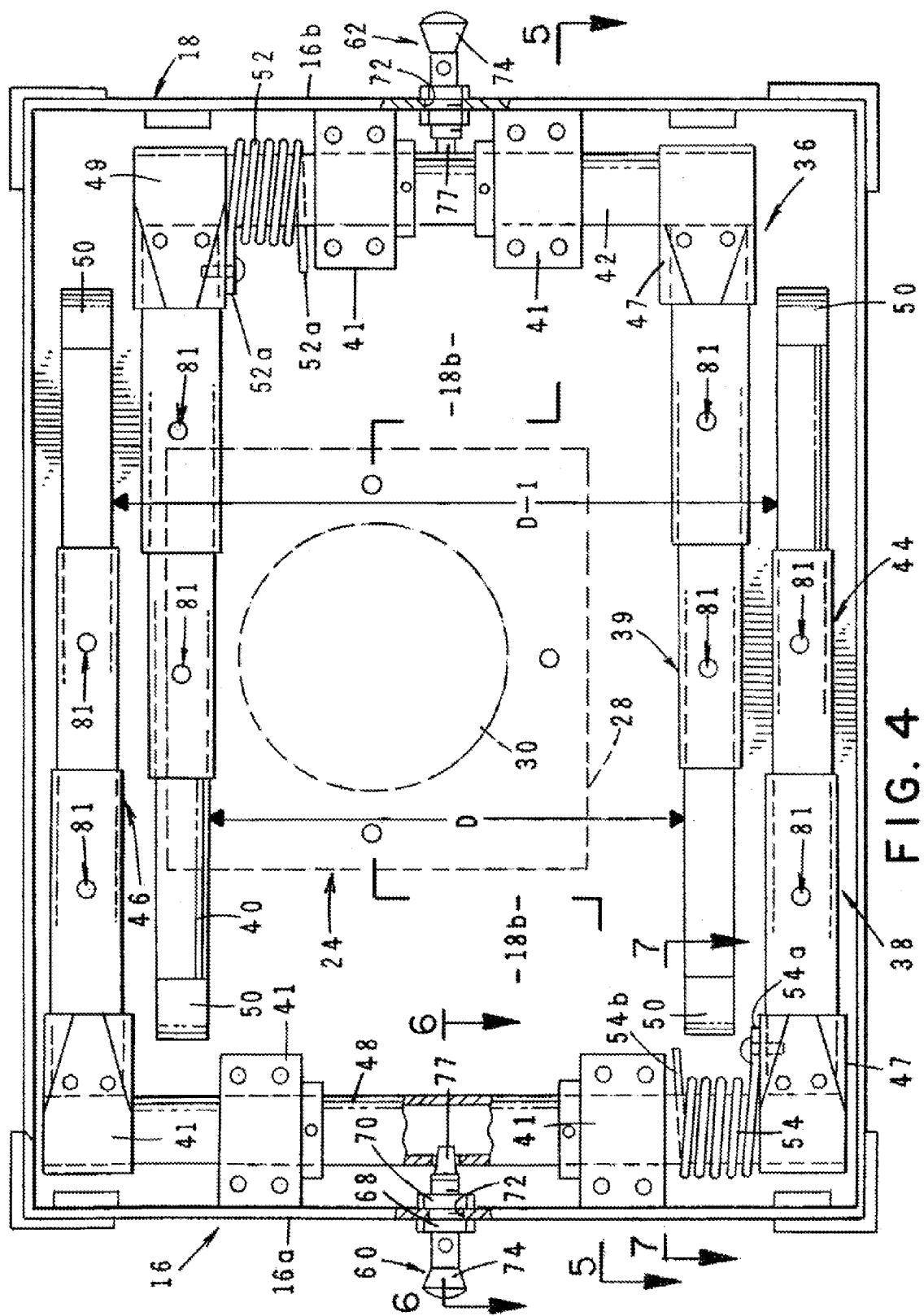

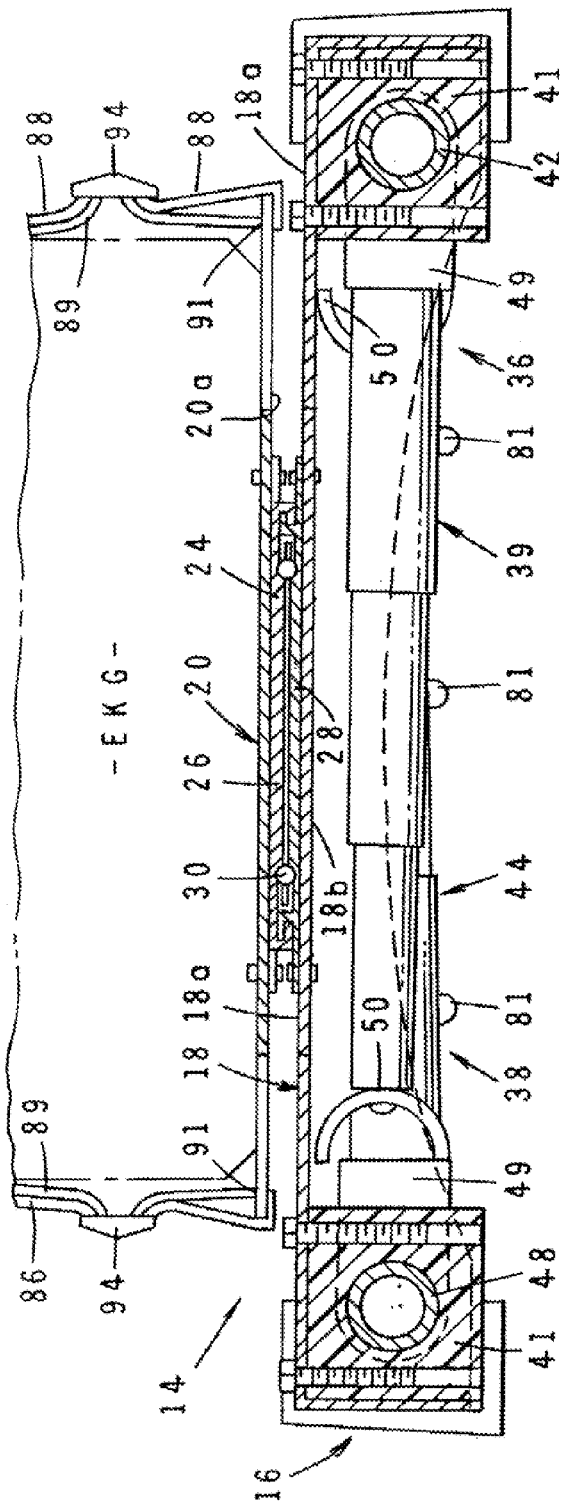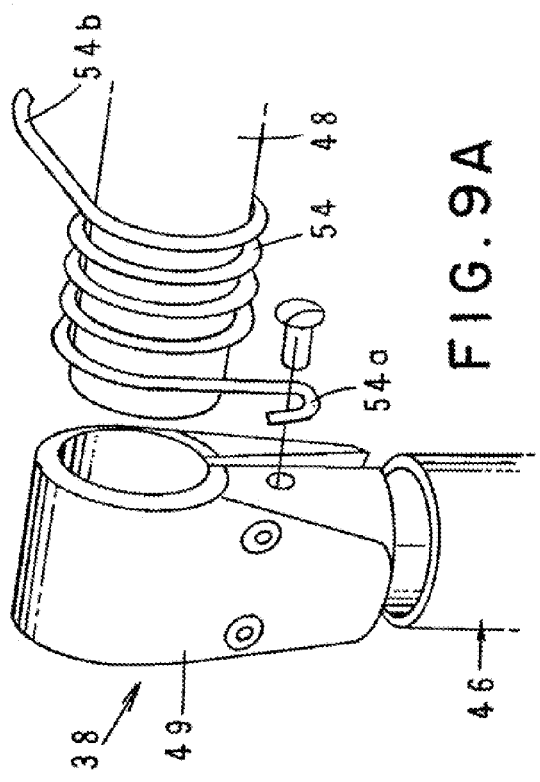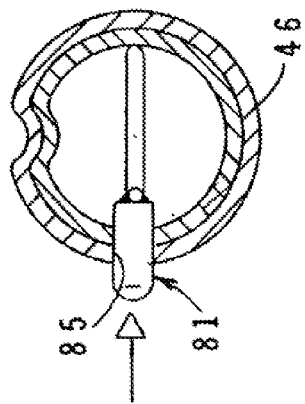

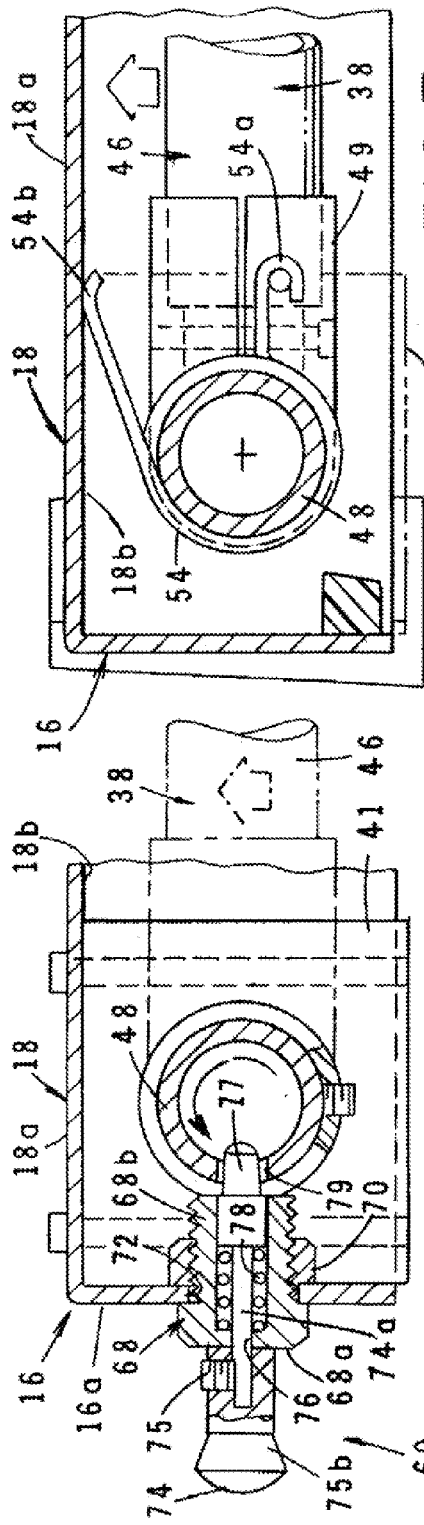
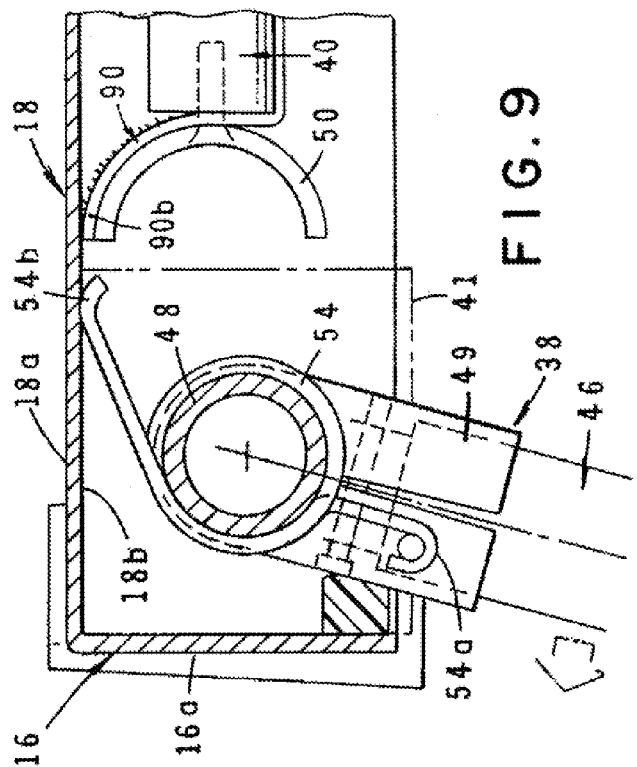
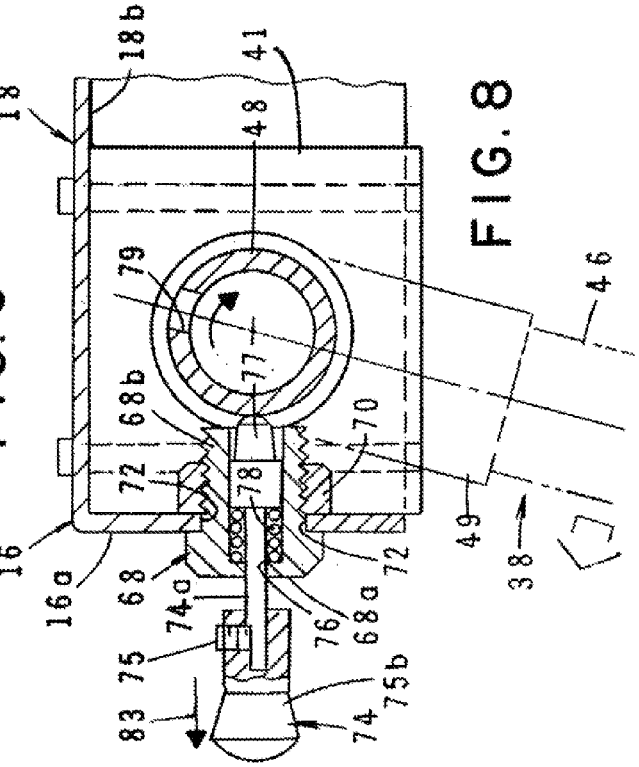

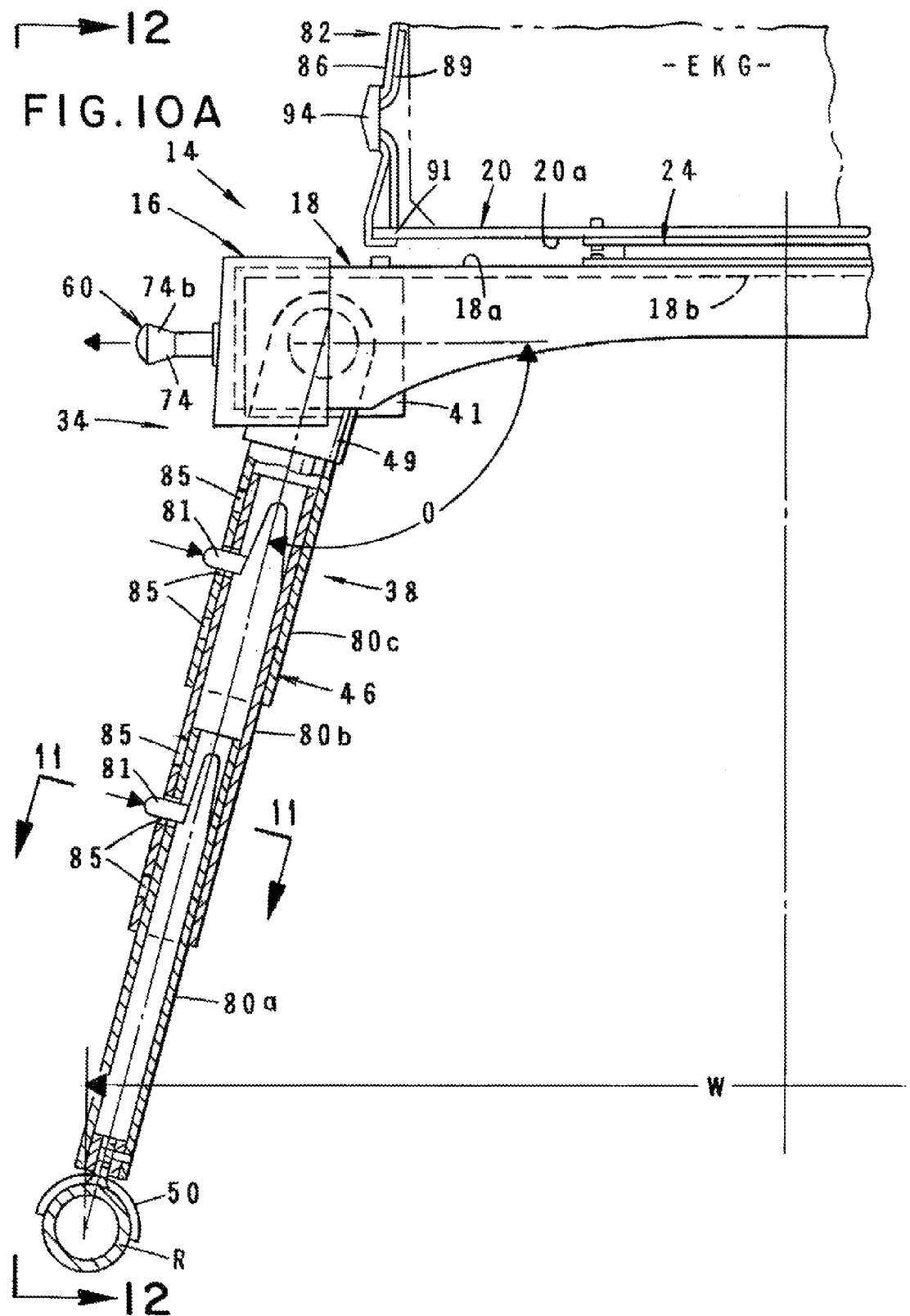

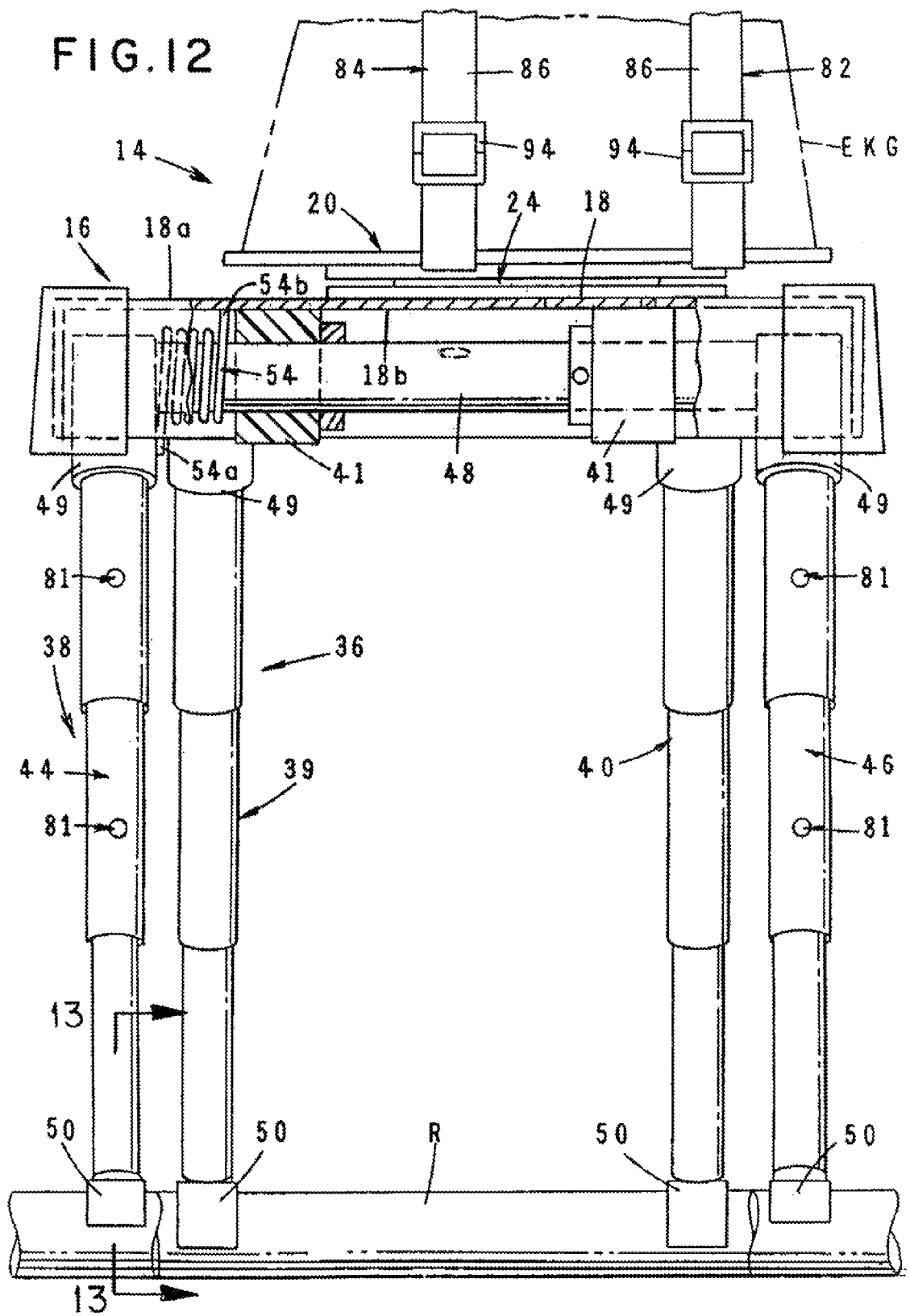

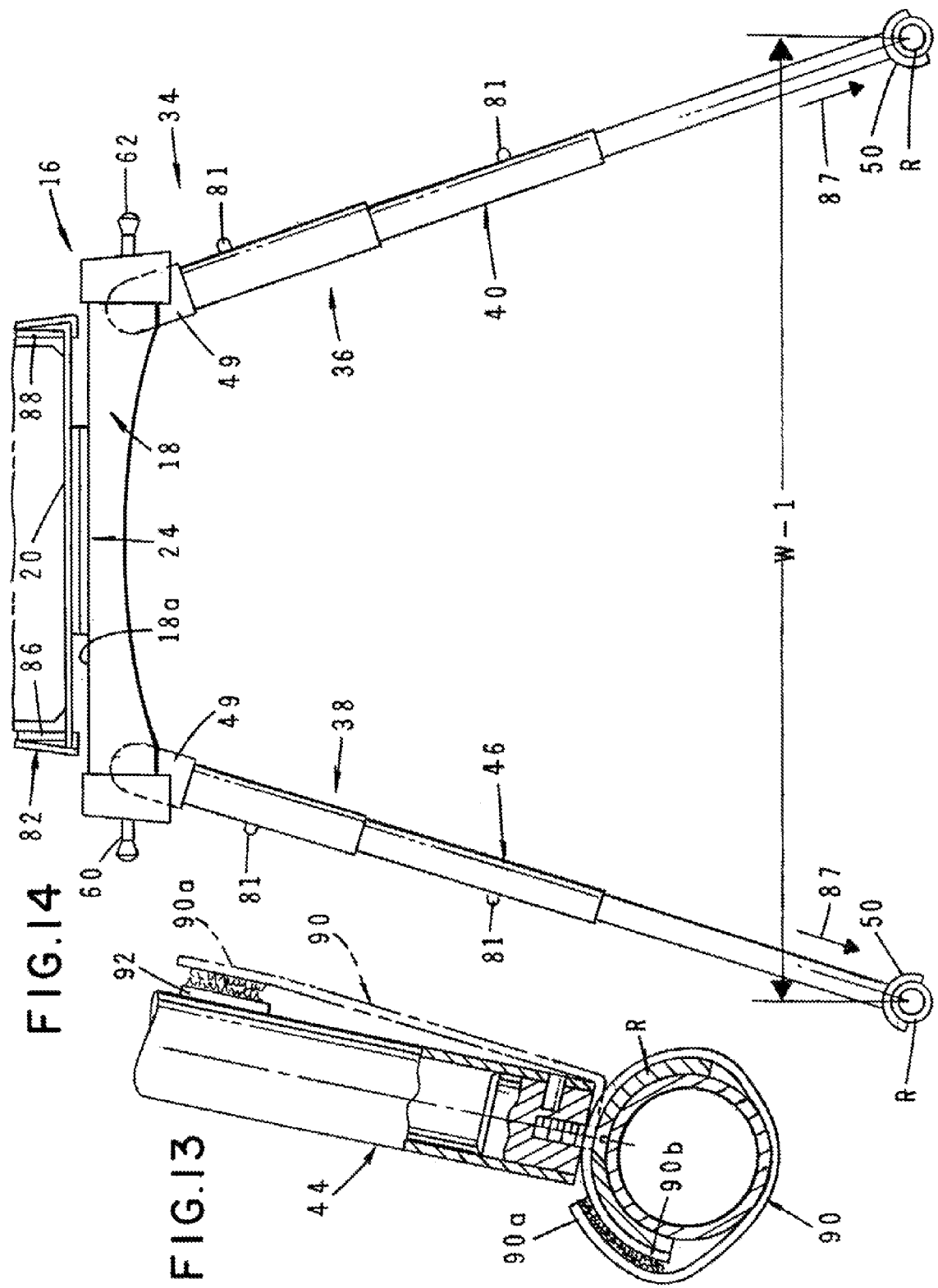

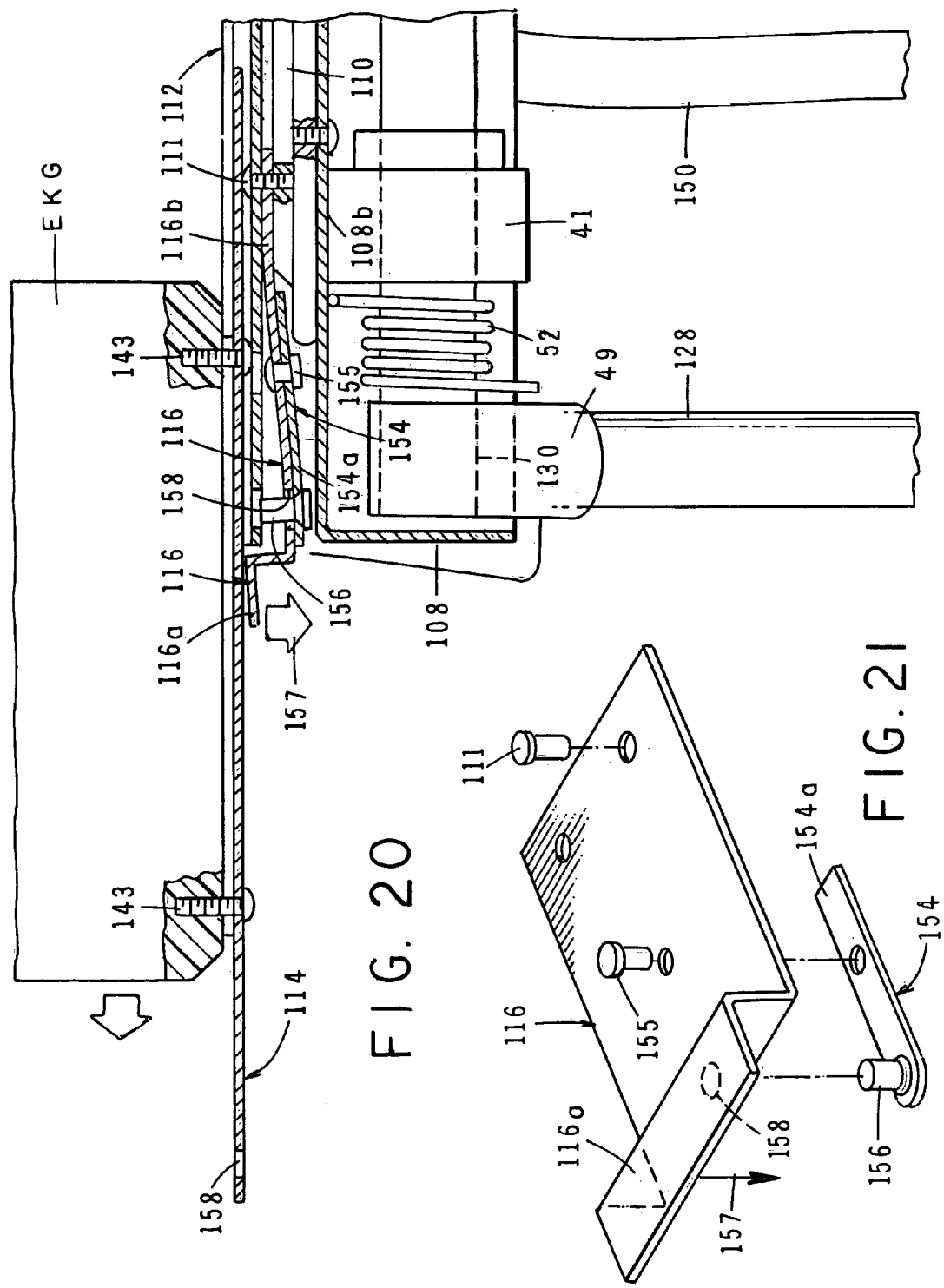

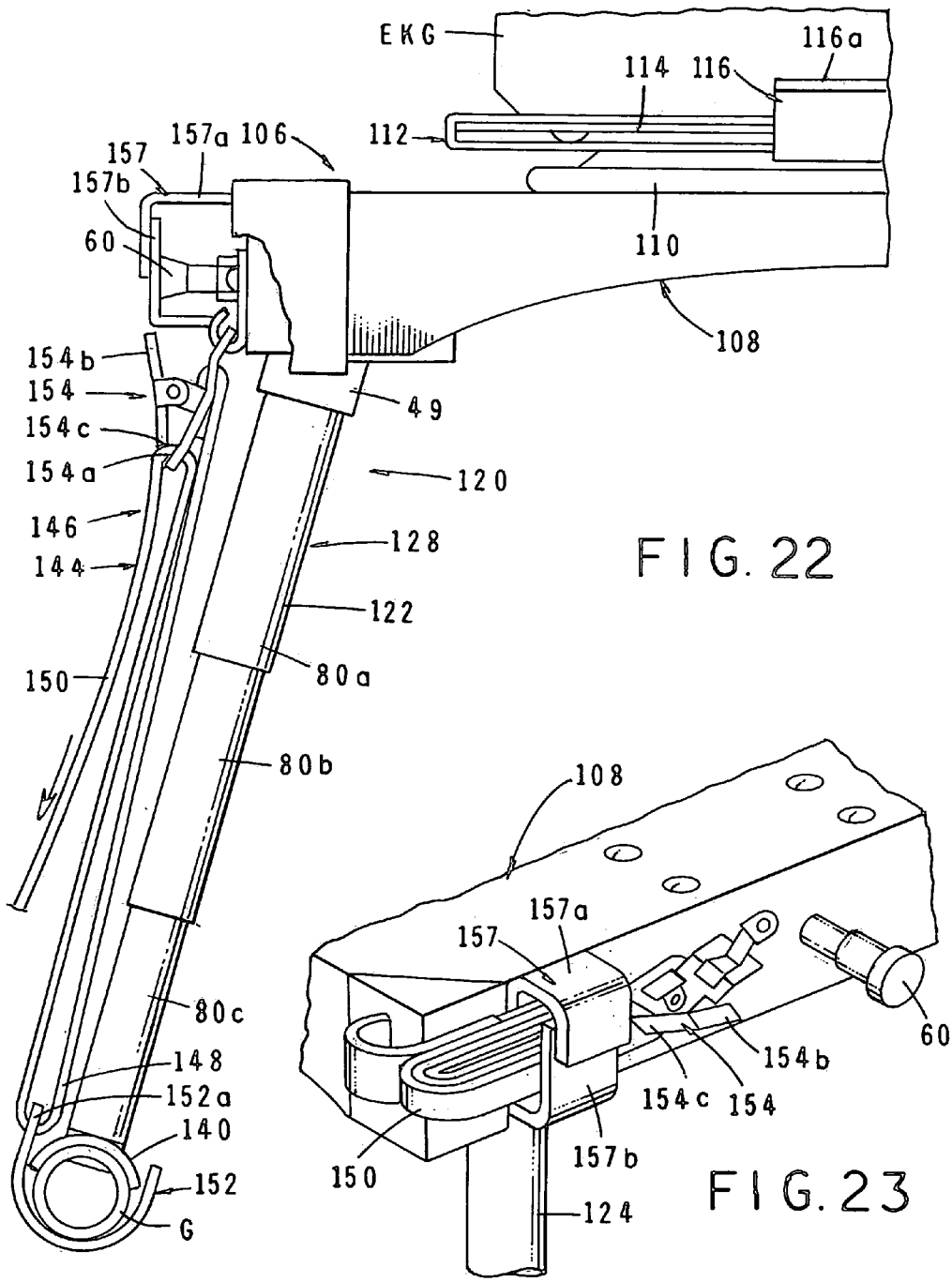

APPARATUS FOR CARRYING CRITICAL CARE EQUIPMENT

CROSS-REFERENCE TO RELATED APPLICATIONS

This is a Continuation-In-Part application of U.S. application Ser. No. 12/316,286 filed Dec. 10, 2008 now abandoned.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to apparatus for carrying critical care equipment needed by a patient being transported on a conventional gurney. More particularly, the invention concerns an adjustable apparatus that carries critical care equipment such as EKG units and that can be conveniently attached to standard gurneys having side rails of different spacing.

2. Description of Related Art

Accident victims as well as critically ill persons are typically transported to care facilities such as hospitals on standard collapsible stretchers or gurneys having spaced-apart side rails. During transport, the vital functions of the patient are typically carefully monitored with units such as EKG units and the patient is often provided with oxygen and various intravenously administered medicaments. The supply of medicaments and the monitoring of vital body functions require the use of equipment and supplies that must be located in close proximity to the patient. Additionally, the medical supplies and the monitoring equipment must be readily accessible to the ambulance attendants to enable them to expeditiously attend to the needs of the patient.

Accordingly, a need exists for a compact, easy-to-use apparatus that can be readily interconnected with gurneys of various designs and one that will efficiently support critical care equipment in a manner such that, during patient transport, the equipment is readily accessible to and viewable by the ambulance attendants. Several attempts have been made in the past to provide such an apparatus. Representative of one such prior art attempt is the apparatus disclosed in U.S. Pat. No. 5,845,351 issued to Berta et al. This patent describes a stretcher table assembly for attachment over an ambulance stretcher. The stretcher table assembly includes a tray for securing medical equipment used during an emergency. A pair of legs extends away from the tray and includes attachment members for engaging the rails of the stretcher. The attachment members may include anti-skidding members providing frictional resistance between the attachment members and the rails. The legs are secured to the rails through a flexible strap. The flexible strap may be wrapped around the rail and secured. The flexible strap may also be used in conjunction with a hook which engages the rail. The flexible strap is then secured to hold the stretcher table assembly in place over the stretcher.

A somewhat similar prior art apparatus is disclosed in U.S. Pat. No. 6,446,285 issued to Chinn. This apparatus comprises a stretcher table assembly for attachment over an ambulance stretcher. The stretcher table assembly includes a tillable support surface for securing emergency medical equipment. The tillable support surface may be inclined to permit technicians to more easily view the equipment secured thereon. Additionally, the support surface has a grid of holes upon which anchoring devices may be positioned. The anchoring devices permit emergency medical equipment to quickly and easily secure to the support surface without the need of adjusting a strap or buckle. A pair of legs extends away from the support frame and has attachment feet for engaging the rails of the stretcher. Each of the legs is secured to the rails by an attached securing mechanism that holds the tillable stretcher table assembly in place over the stretcher.

SUMMARY OF THE INVENTION

It is an object of the present invention to provide an apparatus for carrying critical care equipment needed by a patient being transported on a conventional gurney, stretcher, or like patient transport device. More particularly, it is an object of the invention to provide an adjustable apparatus for carrying critical care equipment, such as EKG units that can be conveniently attached to standard gurneys having side rails with different spacing.

Another object of the invention is to provide an apparatus of the aforementioned character that includes an equipment support platform to which critical care equipment, such as an EKG, can readily be easily connected and one that can be rotated 360 degrees so that the critical care equipment can easily be viewed by ambulance attendants in both the front and rear of the gurney.

Another object of the invention is to provide an apparatus of the character described in the preceding paragraph in which the support platform to which critical care equipment is attached, can be readily removed from the portion of the apparatus that is connected to the gurney.

Another object of the invention is to provide an apparatus of the character described in the preceding paragraph which includes a novel locking assembly for preventing accidental removal of the of the equipment support platform.

Another object of the invention is to provide an apparatus of the character described in the preceding paragraphs that further includes spaced-apart telescoping, support legs that are inter-connectable with the side rails of the gurney and are foldably connected to the equipment support platform so that the apparatus can be easily folded into a compact configuration for transport and storage.

Another object of the invention is to provide an apparatus of the character described in the preceding paragraph that further includes a locking mechanism for releasably locking the support legs of the apparatus in the retracted, stowed position.

Another object of the invention is to provide an apparatus of the class described that includes a pair of adjustable strap assemblies that function to interconnect the equipment support assembly with the patient transport device.

Another object of the invention is to provide an apparatus of the character described that is light-weight, compact and easy to use.

The foregoing as well as other objects of the invention will be achieved by the novel apparatus illustrated in the drawings and described in the detailed description that follows.

BRIEF DESCRIPTION OF THE DRAWINGS

FIG. 4 is a view taken along lines 4-4 of FIG. 3.

FIG. 5 is a cross-sectional view taken along lines 5-5 of FIG. 4.

FIG. 6 is a cross-sectional view taken along lines 6-6 of FIG. 4.

FIG. 7 is a cross-sectional view taken along lines 7-7 of FIG. 4.

FIG. 8 is a cross-sectional view similar to FIG. 6, but showing the leg locking mechanism of the apparatus moved into a retracted, or release position.

FIG. 9 is a cross-sectional view similar to FIG. 7, but showing the leg assembly illustrated in FIG. 7 moved from the retracted position shown in FIG. 7 to an extended position.

FIG. 9A is a generally perspective view showing the method of inter-connection of the legs of the leg assemblies with the bight portions of the leg assemblies.

FIGS. 10A and 10B when considered together illustrate an end view of the apparatus of the invention with the leg assemblies of the apparatus in an extended position and with one of the legs of one of the leg assemblies shown in cross-section to illustrate internal construction.

FIG. 11 is a greatly enlarged cross-sectional view taken along lines 11-11 of FIG. 10A.

FIG. 12 is a view taken along lines 12-12 of FIG. 10A.

FIG. 13 is a greatly enlarged cross-sectional view taken along lines 13-13 of FIG. 12.

FIG. 14 is an end view of one form of the apparatus of the invention illustrating the extension of the leg assemblies of the apparatus to permit the apparatus to be releasably interconnected with a gurney having side rails of a different spacing from the gurney shown in FIG. 1.

FIG. 20 is a fragmentary cross-sectional view similar to FIG. 19 showing the equipment support platform being separated from the support tray.

FIG. 21 is an enlarged, generally perspective view of the support tray locking assembly of the alternate form of the apparatus of the invention.

FIG. 22 is a fragmentary, side elevational view showing, the construction of one form of the adjustable strap assembly of the invention for removably connecting the equipment support assembly to the patient transport device.

FIG. 23 is an enlarged, generally perspective, fragmentary view showing the manner of stowing the adjustable strap assembly of the invention when it is not in use.

DESCRIPTION OF THE INVENTION

Figure 1:
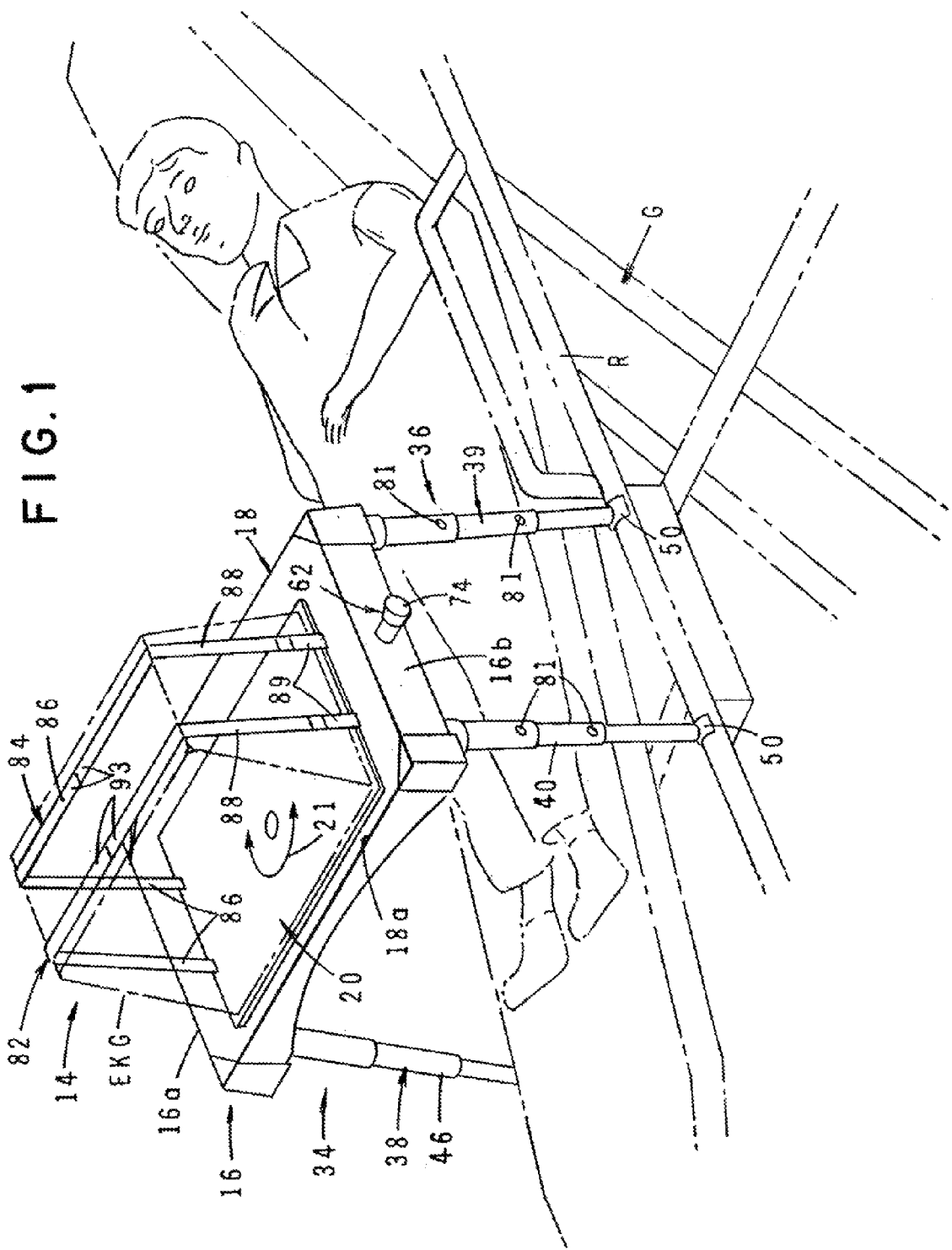
FIG. 1 is a generally perspective view of one form of the apparatus of the invention as it appears when interconnected with the side rails of a conventional gurney.
Figure 2:
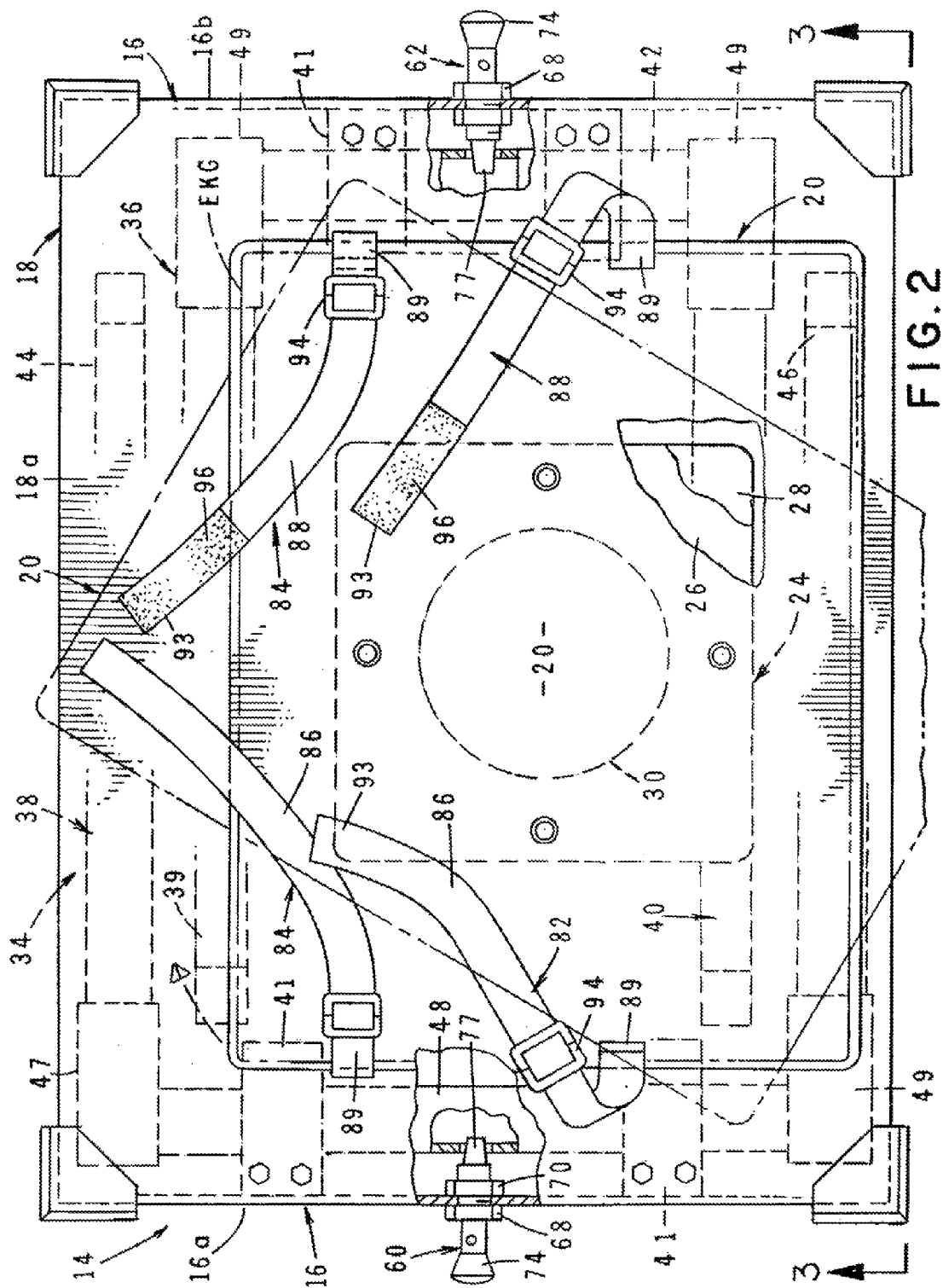
FIG. 2 is a greatly enlarged, top plan view of the apparatus shown in FIG. 1.
Figure 3:
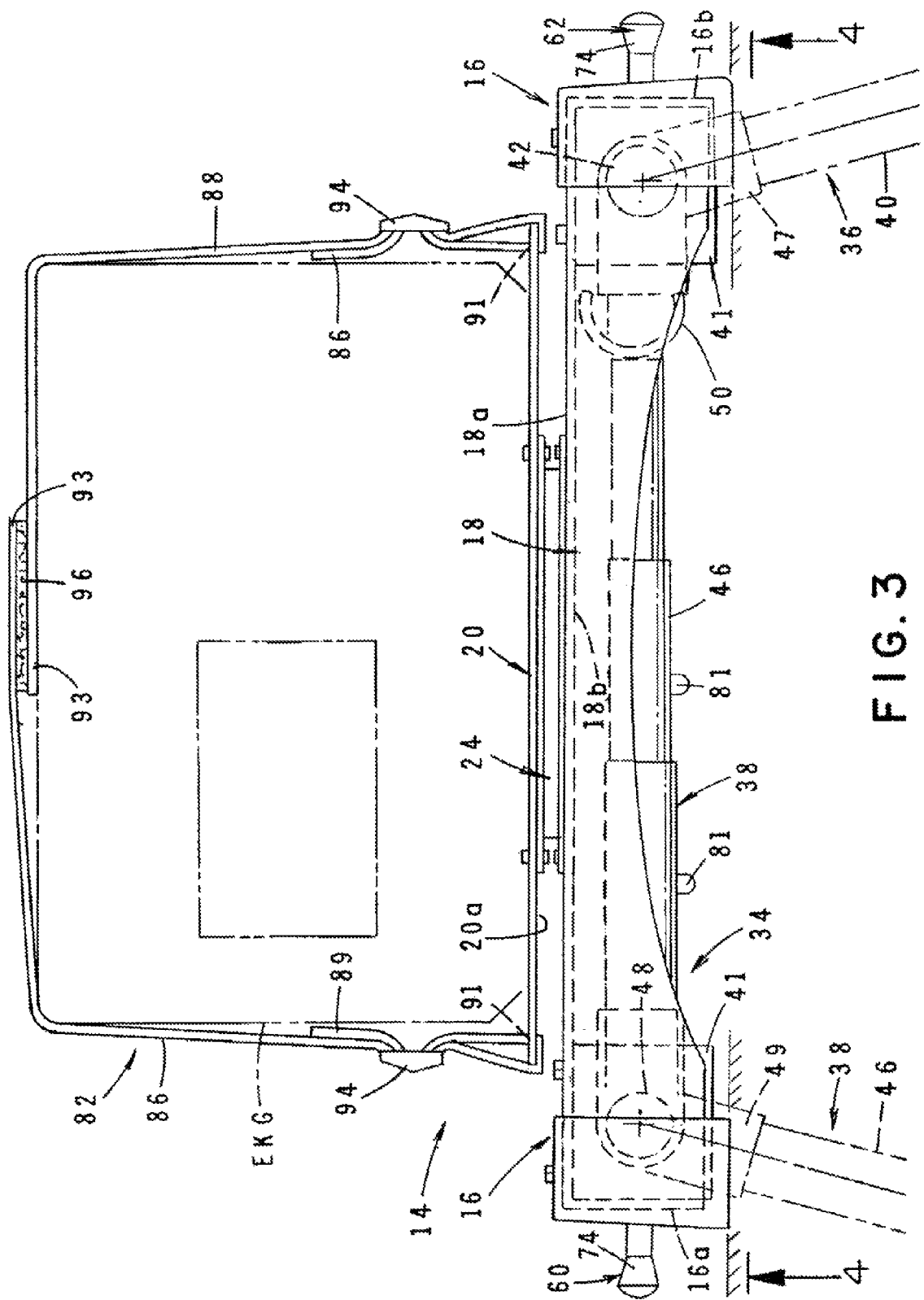
FIG. 3 is a view taken along lines 3-3 of FIG. 2.

Referring to the drawings and particularly to FIGS. 1, 2 and 3, one form of the apparatus of the invention for securely holding elements of critical care equipment in close proximity to a patient lying on patient transport device, such as a gurney "G", is there shown and generally designated by the numeral 14. Apparatus 14 here comprises an equipment support assembly 16 that includes a base 18 having an upper surface 18a and a lower surface 18b (FIG. 5). Apparatus 14 also includes an equipment support platform 20 that is connected to the upper surface 18a of the base 18 for swiveling movement relative thereto in the manner indicated by the arrow 21 in FIG. 1 of the drawings. More particularly, as best seen in FIG. 5, this swiveling movement is made possible through the use of a turntable assembly 24 that is disposed between the upper surface 18a of base 18 and the lower surface 20a of equipment support platform 20. Turntable assembly 24 here comprises an upper plate 26, a lower plate 28 and a turntable bearing assembly 30 that is disposed intermediate the upper and lower plates. Turntable bearing assembly 30 is of conventional design and is readily commercially available from various sources, including Cabinet Accessories of Turnbul, Conn.

Figure 10B:
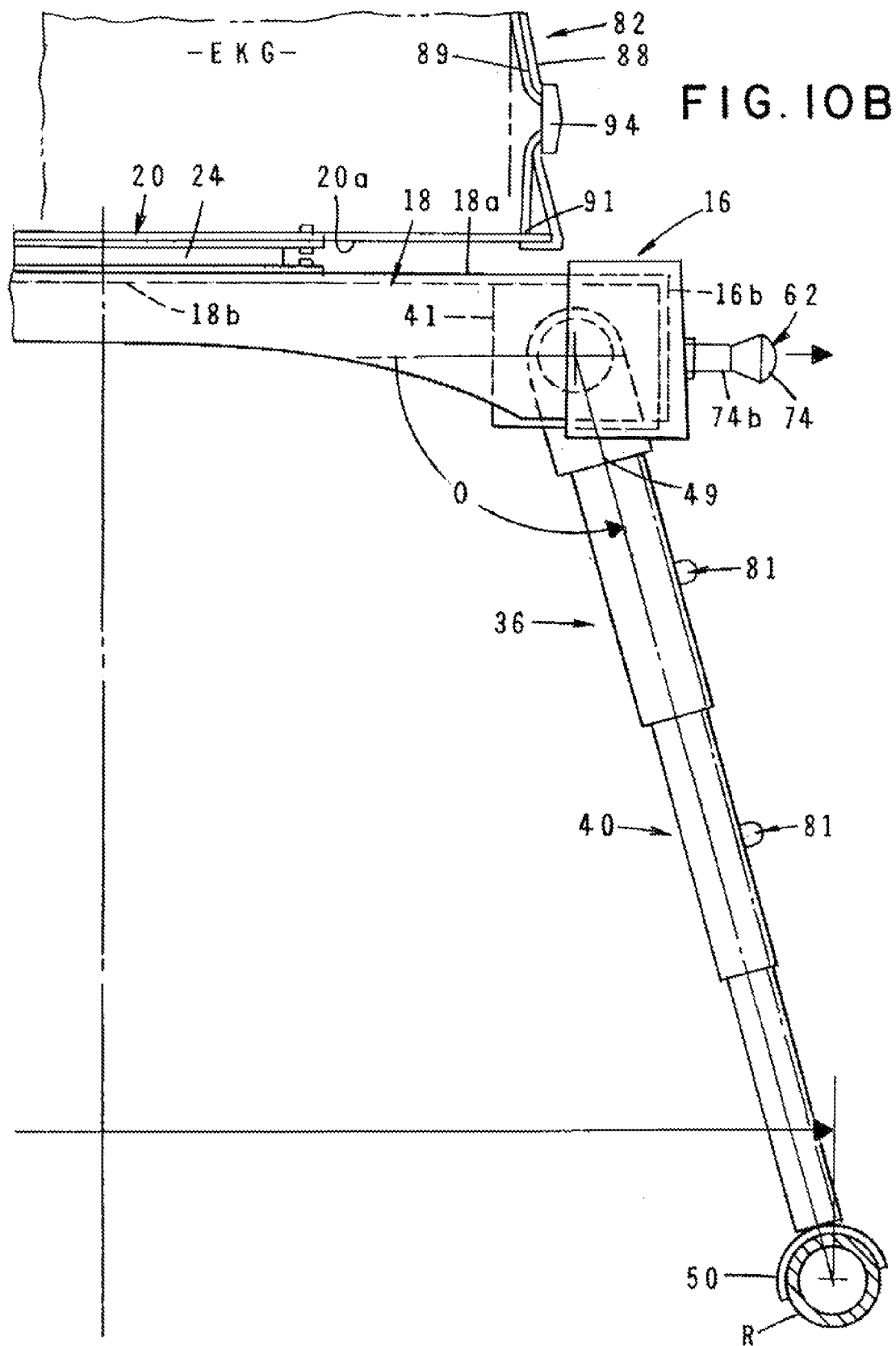

Apparatus 14 also includes a connector assembly 34 that is connected to the equipment support assembly 16 in the manner illustrated in FIGS. 1, 3, 10A and 10B. Connector assembly 34 functions to releasably connect the equipment support assembly 16 to the patient transport device, or gurney "G", in the manner illustrated in FIG. 1 of the drawings. This novel connector assembly here comprises first and second pairs of spaced-apart, generally U-shaped leg assemblies 36 and 38 respectively (see FIG. 4). As best seen in FIGS. 10A and 10B, each support leg assembly 36 and 38 is pivotally connected to the lower surface 18b of base 18 by suitable conventional connector brackets 41 and extends there at an obtuse angle "O".

Turning to FIG. 4 of the drawings, it can be seen that support leg assembly 36 includes first and second spaced apart telescoping legs 39 and 40 that are interconnected by a bight portion 42. Similarly, support leg assembly 38 includes first and second spaced apart telescoping legs 44 and 46 that are interconnected by a bight portion 48. As indicated in FIG. 9A, each of the legs of the leg assemblies 36 and 38 is connected to its respective bight portions by a commercially available elbow 49.

In order that the leg assemblies 36 and 38 can conveniently fold and nest into their retracted position in the manner shown in FIG. 4, the first and second legs 39 and 40 of the first support leg assembly 36 are spaced apart by a first distance "D", while the first and second legs 44 and 46 of the second support leg assembly 38 are spaced apart by a second distance "D-1" that is greater than first distance "D". With this novel construction, the leg assemblies can be pivoted from their extended position shown in FIG. 1 to their retracted position shown in FIG. 4 in a manner such that the leg assemblies are nested and are disposed in close proximity with the lower surface 18b of base 18 of the support assembly 16.

In order to connect the apparatus of the invention to the gurney "G" in the manner shown in FIG. 1, each of the spaced apart support legs of each of said first and second support leg assemblies includes a generally "U" shaped connector foot 50 for engagement with a selected one of the transversely spaced apart side rails "R" of the patient transport device (see, for example, FIGS. 10A and 10B).

As illustrated in FIG. 4, connector assembly 34 further includes biasing means that is operably associated with base 18 of the equipment support assembly for urging the first and second support leg assemblies 36 and 38 of the connector assembly toward the lower surface 18b of base 18. In the present form of the invention, this biasing means comprises conventional torsion springs 52 and 54. As indicated in FIGS. 4, 7 and 9, torsion spring 52 circumscribes bight portion 42 of leg assembly 36 with end 52a thereof, being connected to leg 39 and end 52b thereof, being in engagement with the lower surface 18b of base 18. Similarly, torsion spring 54 circumscribes bight portion 48 of leg assembly 38 in the manner shown in FIG. 4 with end 54a thereof, being connected to leg 46 and end 54b thereof, being in engagement with the lower surface 18b of base 18. As illustrated in FIGS. 7 and 9, with the construction thus described, torsion spring 54 yieldably resists movement of leg assembly 38 from the retracted position shown in FIGS. 4 and 7 toward the extended position shown in FIGS. 1 and 9. Similarly, torsion spring 52 yieldably resists movement of leg assembly 36 from the retracted position shown in FIG. 4 toward the extended position shown in FIG. 1.

In order to releasably lock the first and second leg assemblies 36 and 38 in their retracted position as illustrated in FIG. 4, equipment support assembly 16 further includes locking means that are connected to the sidewalls 16a and 16b of the equipment support assembly. These novel locking means here comprise first and second pull pin locking assemblies 60 and 62. Pull pin locking assembly 60 is mounted on the side wall 16a of equipment support assembly 16, while pull pin locking assembly 62 is mounted on side wall 16b of equipment support assembly 16. Each of the pull pin locking assemblies 60 and 62 is of substantially identical construction and operation and each is of the construction illustrated in FIGS. 6 and 8 of the drawings. As illustrated in FIG. 6, each assembly 60 and 62 comprises a hollow housing 68 having a base wall 68a and a threaded shank portion 68b that threadably receives a locking ring 70. Shank portion 68b is received within apertures 72 formed in each of the sidewalls 16a and 16b of the equipment support assembly 16 and is secured in position within the apertures by locking rings 70. Each locking assembly 60 and 62 includes a pull pin 74 that has a locking pin portion 74a and a head portion 75h that is connected to pin portion 74a by a set screw 75. Locking pin portion 74a extends through an aperture 75 formed in end wall 68 and into hollow housing 68. Disposed within hollow housing 68 is a coil spring 78 that continuously urges pin portion 74a into locking engagement with the bight portion of the adjacent leg assembly in the manner shown in FIG. 6. More particularly, coil spring 78 continuously urges the tip 77 of the pin portion into an aperture 79 formed in the adjacent bight portion. To release the adjacent leg assembly so that it can be folded downwardly, the pull pin is pulled outwardly in the direction of the arrow 81 of FIG. 8 against the urging of coil spring 78 to move the tip 77 of the pin portion out of aperture 79 so as to permit rotation of the bight portion in the manner indicated in FIGS. 8 and 9.

Each of the telescoping legs of the leg assemblies 36 and 38 is of the construction illustrated in FIGS. 10A and 11. More particularly, each leg comprises first, second and third segments 80a, 80b and 80c. A pair of spring loaded detent assemblies 81 of conventional construction and operation (see FIGS. 10A and 11) releasably maintains the legs in the extended position shown in FIG. 10A.

As illustrated in FIGS. 1, 2, 3 and 5 of the drawings, elements of the emergency medical equipment, such as an EKG unit, are secured to the equipment support platform 20 by means of first and second flexible strap assemblies 82 and 84. Flexible strap assemblies 82 and 84, which are substantially identical in construction and operation, each comprises first and second releasably inter-connectable straps 86 and 88 that may be wrapped around the emergency medical equipment in the manner illustrated in FIGS. 1 and 3. Each of the straps 86 and 88 has a first end 89 that extends through slots 91 formed in equipment support platform 20 (FIG. 3) and a second end 93. First ends 89 are connected to equipment support platform 20 by conventional buckles 94 in the manner shown in FIGS. 3 and 5. After the straps are positioned around the emergency medical equipment, such as the EKG, the second ends 93 of the straps are connected together by suitable fastening devices, such as connectors 96 sold under the name and style VELCRO® (FIGS. 2 and 3). In this way, the medical equipment is securely affixed to the support platform 20.

In using the apparatus of the invention and with the apparatus in the configuration shown in FIG. 4, wherein the leg assemblies are folded into their stowed position, the emergency medical equipment such as the EKG is secured to the support platform 20 by strap assemblies 82 and 84 in the manner shown in FIG. 1. With the apparatus in this configuration, it can be easily stored, or transported from place to place as may be required.

When the apparatus is to be used in an emergency situation the apparatus can be carried in the folded configuration to the location at which the apparatus is to be affixed to a patient transport device, such as gurney "G". The locking means 60 and 62 are then operated in the manner previously described to permit the leg assemblies to be moved from the retracted stowed position shown in FIG. 4 of the drawings to the extended operative position shown in FIG. 1. With the legs in the extended position. U-shaped connector feet 50 can be positioned in engagement with the gurney rails "R" in the manner shown in FIG. 1.

An important feature of the apparatus of the invention resides in the fact that, if the rails of the gurney are spaced apart a greater distance than that shown in FIG. 1 of the drawings (for example, see FIG. 14 wherein the legs are spaced apart by a distance "W-1" which is greater than the distance "W" between the legs shown in FIG. 1), the apparatus can be adjusted to accommodate this wider spacing by outwardly telescoping each of the legs of the leg assemblies so as to accommodate the width "W-1". Conversely, if the rails of the gurney are spaced apart a distance less than the distance "D", this distance can be accommodated by telescoping the legs inwardly rather than outwardly so as to decrease the distance that the legs are spaced apart. As indicated in FIG. 10A, each of the legs of the leg assemblies is provided with spaced-apart, detent head receiving apertures 85 so that the legs can be locked in the desired position. This novel leg adjustability feature of the apparatus of the invention allows the apparatus to be used with gurneys, stretchers or the like, which have rails that are spaced different distances apart.

In an alternate form of the invention shown in FIG. 13 of the drawings, a leg securement strap 86 is provided that can be used to releasably interconnect each of the legs with a selected rail "R" of the gurney. Securement strap 86 here comprises an elongated strap having first and second ends 86a and 86b, each of which is provided with a suitable connector device such as connectors sold under the name and style VELCRO®. To releasably interconnect end 86a to a selected leg, a second connector device such as a connector 88 sold under the name and style VELCRO® is affixed to the lower portion of the leg in the manner shown in FIG. 13. In similar fashion, the second end of the securement is provided with mating connector devices so that once the strap is securely wound about the connector foot 50 and the gurney rail "R", the strap can be snugged down and secured in position in the manner illustrated in FIG. 13 to thereby releasably affix the leg assembly to the rail "R".

Figure 17:
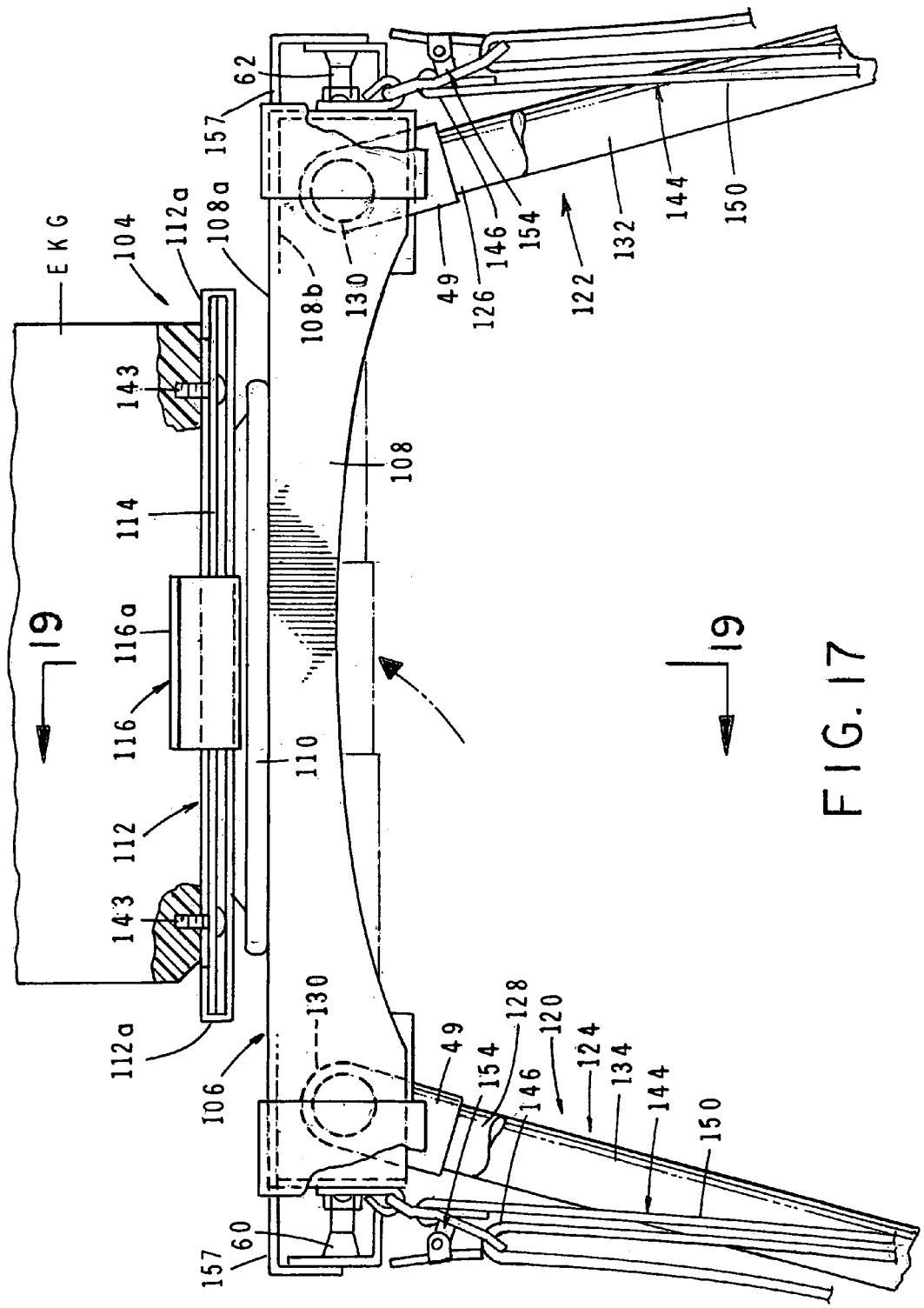
FIG. 17 is a view taken along lines 17-17 of FIG. 16.
Figure 18:
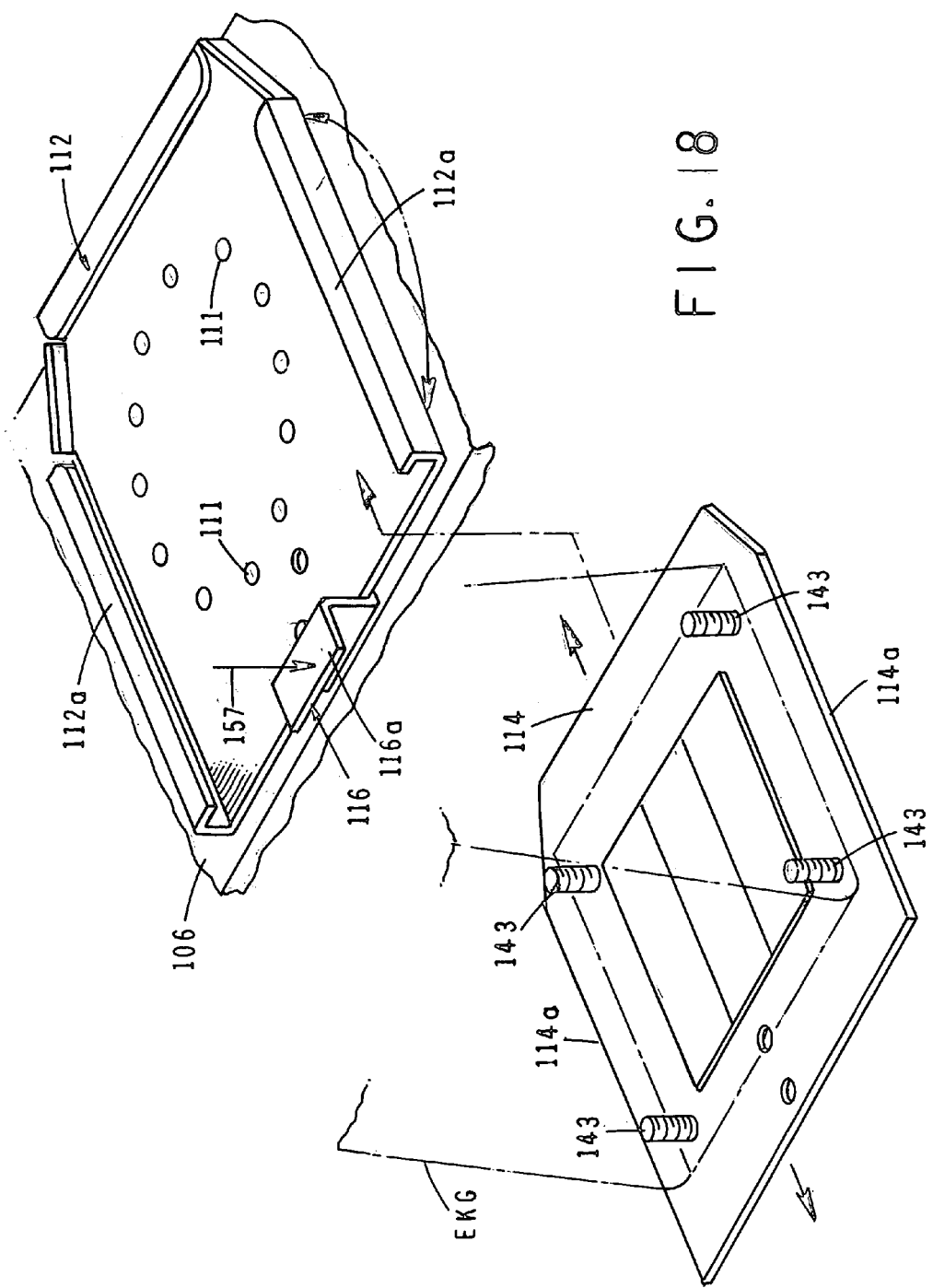
FIG. 18 is a fragmentary, exploded view of the support tray and equipment support platform of the apparatus shown in FIG. 15.
Figure 19:
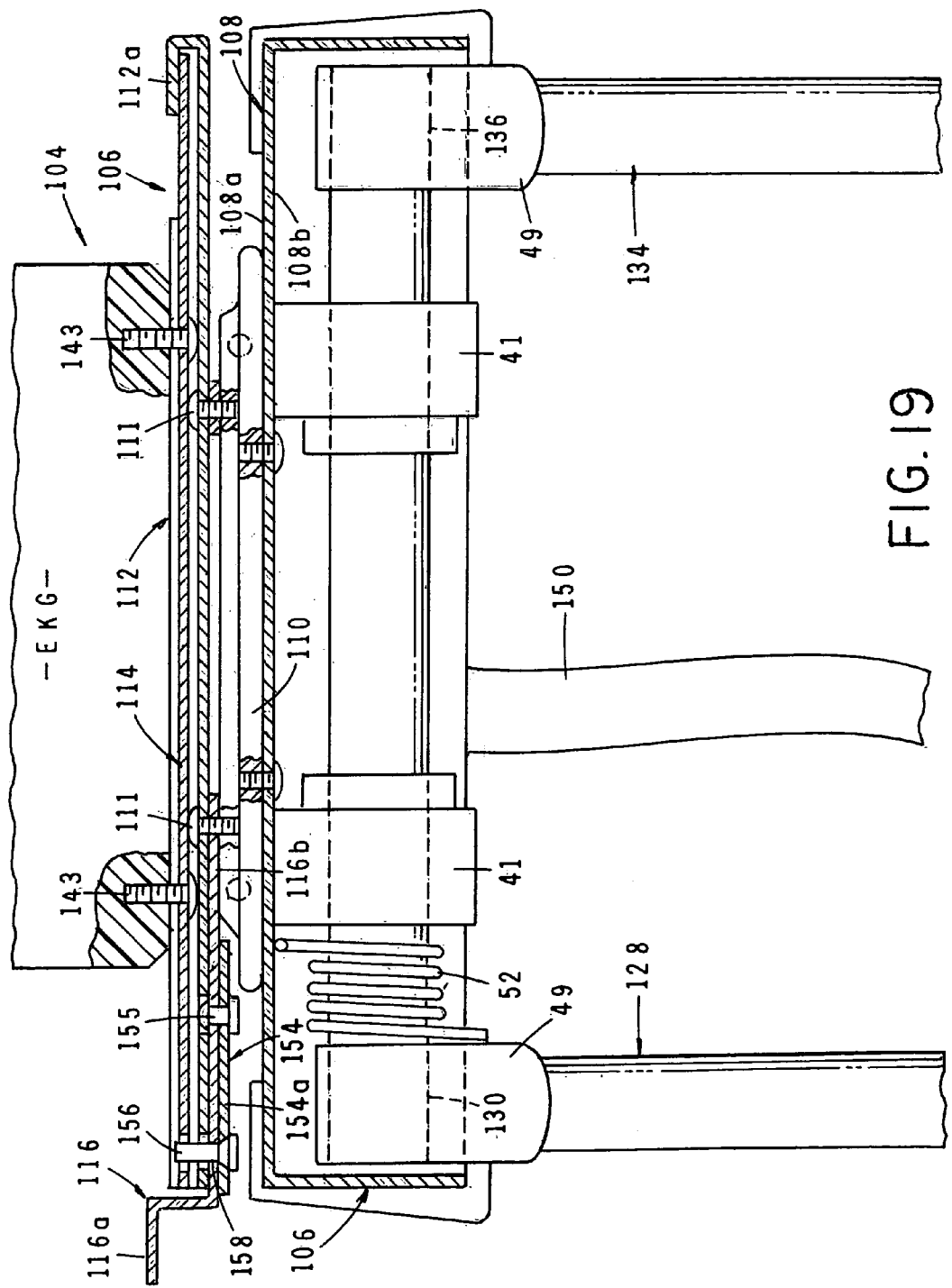
FIG. 19 is a cross-sectional view taken along lines 19-19 of FIG. 17.

Referring now to FIGS. 15 through 23, an alternate form of the apparatus of the invention is there shown and generally designated by the numeral 104. This alternate form of the invention is similar in many respects to that illustrated in FIGS. 1 through 14 and like numerals are used in FIGS. 15 through 23 to identify like components. In this latest form of the invention, the apparatus for securely holding elements of critical care equipment in dose proximity to a patient lying on a patient transport device, or gurney "G", comprises an equipment support assembly 106 that includes a base 108 having an upper surface 108a and a lower surface 108b (FIG. 19). Apparatus 104 also includes a turntable 110 that is connected to said upper surface of base 108 for swiveling movement relative thereto (FIGS. 17 and 19). Turntable 110 is of conventional design and is readily commercially available from various sources, including Cabinet Accessories of Turnbul, Conn. Connected to turntable 110 by a plurality of circumferentially spaced threaded connectors 111 (FIG. 19) is the important support tray 112 of the invention. Support tray 112 is provided with a pair of transversely spaced-apart tracks 112a that slidably receive the equipment support platform 114 of the invention. Equipment support platform 114 (FIG. 18) which supports the critical care equipment, such as an EKG, is slidably movable relative to the support tray between the first position shown FIG. 19 wherein it is in engagement with the support tray and the second position shown in FIG. 18, wherein it is disengaged from the support tray. More particularly, equipment support platform 114 has transversely spaced apart edges 114a that are slidably received within the spaced apart tracks 112a of the support tray. In order to prevent accidental movement of the equipment support platform 114 between its first position and second positions, a novel locking assembly 116 (FIG. 19) is provided. The construction and operation of the locking assembly will presently be described.

As in the earlier described embodiment of the invention a novel connector assembly 120 is provided for connecting equipment support assembly 106 to the patient transport device, or gurney "G". Connector assembly 120, which is similar in many respects to that illustrated in FIGS. 1 through 14, here comprises first and second pairs of spaced-apart, generally U-shaped leg assemblies 122 and 124, respectively. As before, each support leg assembly is pivotally connected to the lower surface 108b of base 108 by suitable conventional connector brackets 41 and extends therefrom at an obtuse angle. Support leg assembly 122 includes first and second spaced-apart telescoping legs 126 and 128 that are interconnected by a bight portion 130. Similarly, support leg assembly 124 includes first and second spaced-apart telescoping legs 132 and 134 that are interconnected by a bight portion 136. As in the earlier described embodiment, each of the legs of the leg assemblies is connected to its respective bight portions by a commercially available elbow 49.

In order that the leg assemblies 122 and 124 can conveniently fold and nest into their retracted position, the first and second legs 126 and 128 of the first support leg assembly 122 are spaced apart by a first distance "D", while the first and second legs 132 and 134 of the second support leg assembly are spaced apart by a second distance "D-1" that is greater than first distance "D". With this novel construction, the leg assemblies can be pivoted from their extended position shown in FIG. 15 to their retracted position a manner such that the leg assemblies are nested and are disposed in close proximity with the lower surface 108b of base 108 of the support assembly 106.

Figure 15:
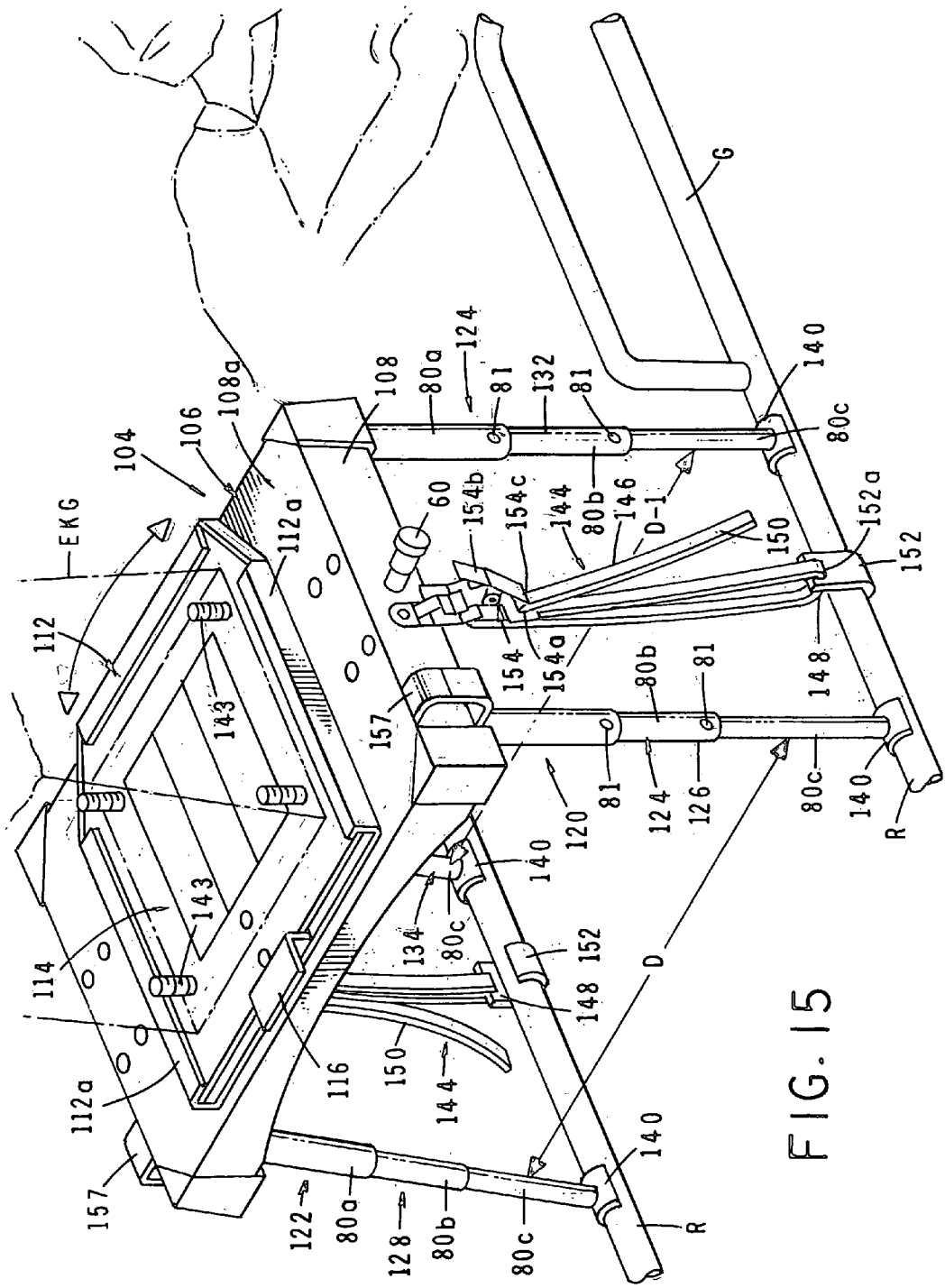
FIG. 15 is a generally perspective view of an alternate form of the apparatus of the invention as it appears when interconnected with the side rails of a conventional gurney.
Figure 16:
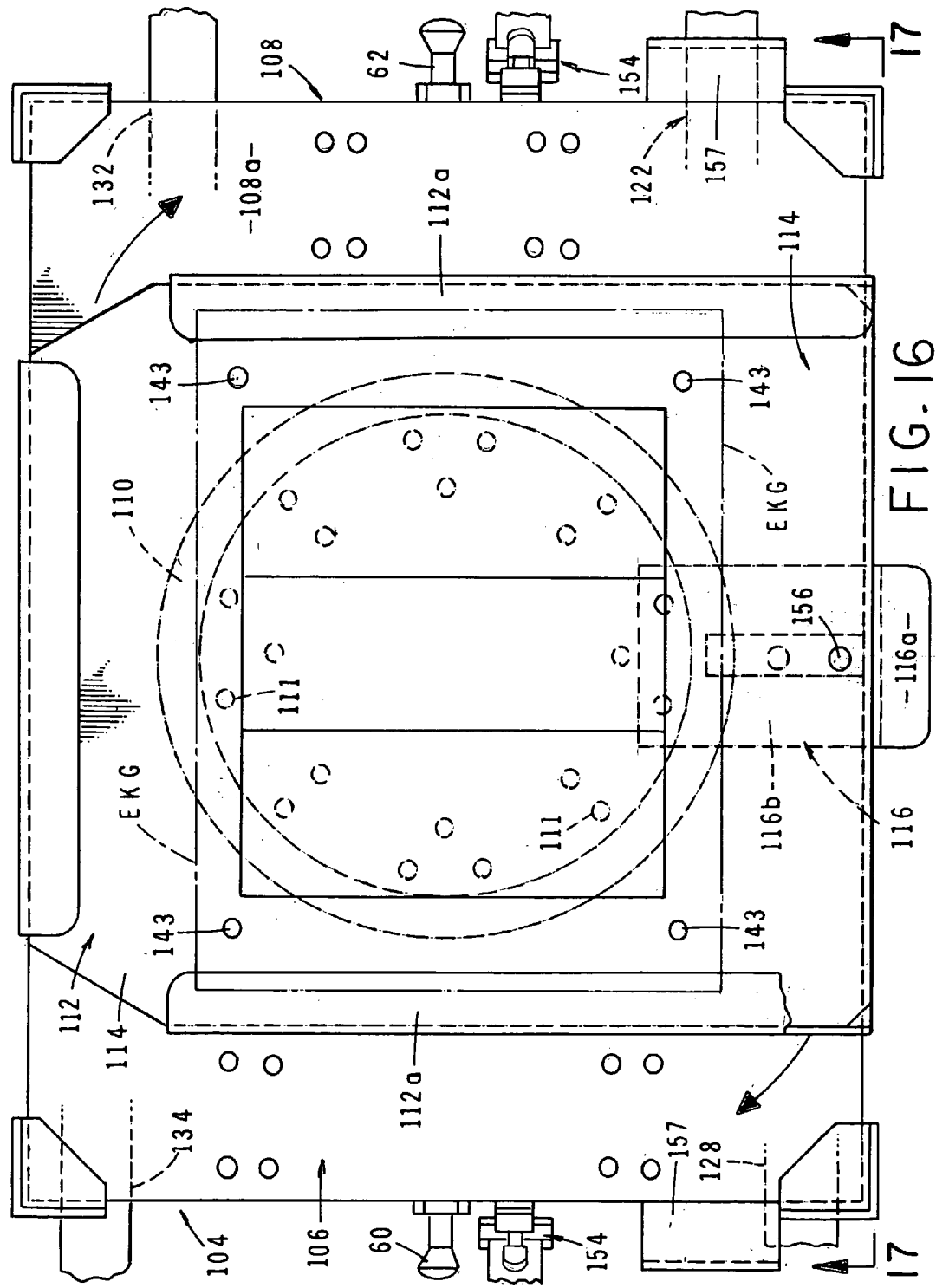
FIG. 16 is a top plan view of the apparatus shown in FIG. 15.

In order to connect the apparatus of the invention to the gurney "G" in the manner shown in FIG. 15, each of the spaced-apart support legs of each of said first and second support leg assemblies includes a generally "U" shaped connector foot 140 for longitudinal engagement with a selected one of the transversely spaced-apart side rails "R" of the patient transport device.

As in the embodiment of FIGS. 1 through 14, each of the connector assemblies further includes biasing means that is operably associated with base 108 of the equipment support assembly for urging the first and second support leg assemblies of the connector assembly toward the lower surface 108b of base 108. In the present form of the invention, this biasing means comprises conventional torsion springs, such as torsion springs 52 and 54. As indicated in FIGS. 4, 7 and 19, the torsion springs circumscribe the bight portions 42 of the leg assemblies with one end thereof being connected to the legs and the other end thereof being in engagement with the lower surface 108b of base 108 (see for example, FIG. 19). With this construction and in the manner previously described, the torsion springs yieldably resist movement of the leg assemblies from the retracted position toward the extended position.

In order to releasably lock the first and second leg assemblies in their retracted position, equipment support assembly 106 further includes leg locking means that are connected to the sidewalk of the equipment support assembly. These novel leg locking means here comprise first and second pull pin locking assemblies 60 and 62 that are of substantially identical construction and operation to those previously described.

Each of the telescoping legs of the leg assemblies 122 and 124 comprises first, second and third segments 80a, 80b and 80c. A pair of spring loaded detent assemblies 81 of conventional construction and operation releasably maintain the legs in the extended position shown in FIG. 15.

As illustrated in FIGS. 17, 19, and 21 of the drawings, elements of the emergency medical equipment, such as an EKG unit, are secured to the equipment support platform 114 by means of threaded connectors 143.

Forming an important part of the connector assembly 120 of the present invention is a pair of adjustable strap assemblies 144, each having a first end 146 connected to equipment support assembly and a second end 148 removably connected to the patient transport device. Strap assemblies 144, which are substantially identical in construction and operation, each comprise an elongated, flexible strap 150 that is entrained through an opening 152a formed in a hook-like member 152 that is hooked over the gurney rail (FIG. 15) and is also entrained through an opening 154a formed in a toggle assembly 154. Toggle assembly 154 includes a locking leg 154b, the toothed extremity 154c of which is normally urged into engagement with the strap in the manner shown in the drawings. When the toggle assembly is in this locked position (see particularly, FIG. 17), the strap 150 is locked against loosening movement and functions to secure the equipment support assembly to the gurney. When the locking leg 154b of the toggle assembly 154 is pivoted into the release position by pushing inwardly on the upper end of the locking leg, the strap is released and can be loosened so that the strap assembly can be disconnected from the gurney and stowed in the manner illustrated in FIG. 23 within a storage housing 157 that is affixed to base 108. Storage housing 157 can be constructed of various materials, but is here formed from cooperating straps 157a and 157b of a material sold under the name and style VELCRO®.

In using the apparatus of the invention, the EKG is first secured to the equipment support platform 114 by connectors 143. This done, the assemblage thus formed can be interconnected with support tray 112 by first pressing down on the leg 116a of plate 116b of the locking assembly 116 against the urging of a spring 154a of a spring assembly 154 in the manner indicated by the arrows 157 of FIGS. 18 and 21 (see FIG. 21). Spring 154a, which is connected to the lower surface of plate 116b by a connector pin 155, is also provided with a locking pin 156 proximate its outboard end that, in its normal position shown in FIG. 19, prevents sliding movement of equipment support platform 114. The shank of locking pin 156, which is received within an aperture 158 formed in leg 116a, will clear the aperture when the locking assembly 116 is depressed (see FIG. 20), thereby permitting sliding movement of the equipment support platform 114 relative to tray 112. With the locking assembly 116 depressed, it is clear that the equipment support platform 114, along with the EKG, can be conveniently inserted into or removed from the support tray 112. With the equipment support platform 114, along with the EKG, removed and with the telescoping, legs and the strap assemblies 144 stowed, the apparatus of the invention can be easily stored, or transported from place to place as may be required.

When the apparatus is to be used in an emergency situation, the apparatus can be affixed to a patient transport device, such as gurney "G". The locking means 60 and 62 are then operated in the manner previously described to permit the leg assemblies to be moved from the retracted stowed position to the extended operative position shown in FIG. 1. With the legs in the extended position, U-shaped connector feet 1400 can be positioned in engagement with the gurney rails "R" in the manner shown in FIG. 15.

As before, if the rails of the gurney are spaced apart a greater distance than that shown in FIG. 15 of the drawings, the apparatus can be adjusted to accommodate this wider spacing by outwardly telescoping each of the legs of the leg assemblies so as to accommodate the width. Conversely, the rails of the gurney are spaced apart a distance less than the distance "D", this distance can be accommodated by telescoping the legs inwardly rather than outwardly, so as to decrease the distance that the legs are spaced apart. This novel leg adjustability feature of the apparatus of the invention allows the apparatus to be used with gurneys, stretchers or the like, which have rails that are spaced different distances apart.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. An apparatus for securely holding elements of critical care equipment in close proximity to a patient lying on a patient transport device of the character having transversely spaced apart rails, the apparatus comprising:
   (a) an equipment support assembly, including:
      (i) a base having an upper and lower surface;
      (ii) a turntable connected to said upper surface of said base for swiveling movement relative thereto;
      (iii) a support tray connected to said turntable; and
      (iv) an equipment support platform slidably connected to said support tray for movement relative to said support tray between a first position in engagement with said support tray and second position wherein said equipment support platform is disengaged from said support tray; and
   (b) a connector assembly connected to said equipment support assembly for connecting said equipment support assembly to the patient transport device, said connector assembly comprising first and second generally "U" shaped support leg assemblies connected to said base of said equipment support assembly, each of said first and second support leg assemblies comprising a pair of telescoping legs extending from said base at an obtuse angle, said pair of legs of said first support leg assembly being spaced apart by a first distance and said pair of legs of said second support leg assembly being spaced apart by a second distance greater than said first distance; wherein each of said pair of legs of each of said first and second support leg assemblies includes a generally "U" shaped connector foot for engagement with a selected one of the transversely space apart rails of the patient transport device.

2. The apparatus as defined in claim 1 in which said support tray of said equipment support assembly includes transversely spaced apart tracks for slidably receiving said equipment support platform.

3. The apparatus as defined in claim 1 in which said connector assembly further includes an adjustable strap assembly having a first end connected to said equipment support assembly and a second end removably connected to said patient transport device.

4. The apparatus as defined in claim 1 in which each of said first and second support leg assemblies of said connector assembly is pivotally connected to said base of said equipment support assembly for movement between an extended position and a retracted position wherein said first and second support leg assemblies are disposed in close proximity to said lower surface of said base of said equipment support assembly.

5. The apparatus as defined in claim 4 in which said connector assembly further includes biasing means operably associated with said base of said equipment support assembly for urging said first and second support leg assemblies of said connector assembly toward said lower surface of said base of said equipment support assembly.

6. The apparatus as defined in claim 5 in which said equipment support assembly further includes locking means connected to said base of said equipment support assembly for releasably locking said first and second support leg assemblies of said connector assembly in said retracted position.

7. An apparatus for securely holding elements of critical care equipment in close proximity to a patient lying on a patient transport device of the character having transversely spaced apart rails, the apparatus comprising:
   (a) an equipment support assembly, including:
      (i) a base having an upper and lower surface;
      (ii) a turntable connected to said upper surface of said base for swiveling movement relative thereto;
      (iii) a support tray connected to said turntable, said support tray having transversely spaced apart tracks; and
      (iv) an equipment support platform having transversely spaced apart edges slidably received within said transversely spaced apart tracks of said support tray, said equipment support platform being slidably movable relative to said support tray between a first position in engagement with said support tray and a second position wherein said equipment support platform is disengaged from said support tray; and
   (b) a connector assembly connected to said equipment support assembly for connecting said equipment support assembly to the patient transport device, said connector assembly comprising:
      (i) first and second generally "U" shaped support leg assemblies pivotally connected to said base of said equipment support assembly for movement between an extended position and a retracted position wherein said first and second support leg assemblies are disposed in close proximity to said lower surface of said base of said equipment support assembly, each said first and second support leg assemblies comprising a pair of telescoping legs extending from said base at an obtuse angle, each of said pair of legs including a generally "U" shaped connector foot for engagement with a selected one of the transversely spaced apart rails of the patient transport device;
(ii) an adjustable strap assembly having a first end connected to said equipment support assembly and a second end removably connected to said patient transport device; and
(iii) biasing means operably associated with said base of said equipment support assembly for urging said first and second support leg assemblies of said connector assembly toward said lower surface of said base of said equipment support assembly.

8. The apparatus as defined in claim 7 in which said equipment support assembly further includes locking means connected to said base of said equipment support assembly for releasably locking said first and second support leg assemblies of said connector assembly in said retracted position, said locking means comprising first and second pull pin assemblies connected to said equipment support assembly.

9. An apparatus for securely holding elements of critical care equipment in close proximity to a patient lying on a patient transport device of the character having transversely spaced apart rails, the apparatus comprising:
(a) an equipment support assembly, including:
  (i) a base having an upper and lower surface;
  (ii) a turntable connected to said upper surface of said base for swiveling movement relative thereto;
  (iii) a support tray connected to said turntable, said support tray having transversely spaced apart tracks;
  (iv) an equipment support platform having transversely spaced apart edges slidably received within said transversely spaced apart tracks of said support tray, said equipment support platform being slidably movable relative to said support tray between a first position in engagement with said support tray and a second position wherein said equipment support platform is disengaged from said support tray; and
  (v) a locking assembly connected to said support tray for preventing movement of said equipment support platform between said first position and said second position; and
(b) a connector assembly connected to said equipment support assembly for connecting said equipment support assembly to the patient transport device, said connector assembly comprising:
  (i) first and second generally "U" shaped support leg assemblies pivotally connected to said base of said equipment support assembly for movement between an extended position and a retracted position wherein said first and second support leg assemblies are disposed in close proximity to said lower surface of said base of said equipment support assembly, each said first and second support leg assemblies comprising:
    a. a pair of telescoping legs extending from said base at an obtuse angle; and
    b. a generally "U" shaped connector foot connected to each of said telescoping legs for engagement with a selected one of the transversely spaced apart rails of the patient transport device; and
  (ii) an adjustable strap assembly having a first end connected to said equipment support assembly and a second end removably connected to said patient transport device; wherein said connector assembly further includes biasing means operably associated with said base of said equipment support assembly for urging said first and second support leg assemblies of said connector assembly toward said lower surface of said base of said equipment assembly.

10. The apparatus as defined in claim 9 in which said equipment support assembly further includes locking means connected to said base of said equipment support assembly for releasably locking said first and second support leg assemblies of said connector assembly in said retracted position, said locking means comprising first and second pull pin assemblies connected to said equipment support assembly.

* * * * *